(12) United States Patent
Østergaard

(10) Patent No.: US 9,271,510 B2
(45) Date of Patent: Mar. 1, 2016

(54) METHOD OF SUSPENDING A BIRD FROM A SHACKLE AND AN APPARATUS FOR SUSPENDING BIRDS

(71) Applicant: LINCO FOOD SYSTEMS A/S, Trige (DK)

(72) Inventor: Bent Østergaard, Svenstrup (DK)

(73) Assignee: LINCO FOOD SYSTEMS A/S, Trige (DK)

( * ) Notice: Subject to any disclaimer, the term of this patent is extended or adjusted under 35 U.S.C. 154(b) by 0 days.

(21) Appl. No.: 14/421,587

(22) PCT Filed: Aug. 19, 2013

(86) PCT No.: PCT/DK2013/050268
§ 371 (c)(1),
(2) Date: Feb. 13, 2015

(87) PCT Pub. No.: WO2014/026695
PCT Pub. Date: Feb. 20, 2014

(65) Prior Publication Data
US 2015/0208677 A1    Jul. 30, 2015

(30) Foreign Application Priority Data
Aug. 17, 2012 (DK) .................................. 2012 70485

(51) Int. Cl.
*A22C 21/00*    (2006.01)

(52) U.S. Cl.
CPC ......... *A22C 21/0007* (2013.01); *A22C 21/0046* (2013.01); *A22C 21/0053* (2013.01)

(58) Field of Classification Search
CPC ............. A22C 21/007; A22C 21/0046; A22C 21/0053

USPC .................................. 452/185, 187–191, 197
See application file for complete search history.

(56) References Cited

U.S. PATENT DOCUMENTS

| | | | |
|---|---|---|---|
| 2,981,972 A | | 5/1961 | Zebarth |
| 3,643,293 A | | 2/1972 | Rejsa et al. |
| 3,744,087 A | | 7/1973 | Vertegaal |
| 4,660,256 A | | 4/1987 | Innes et al. |
| 5,026,317 A | * | 6/1991 | Kennedy ........................ 452/106 |

(Continued)

FOREIGN PATENT DOCUMENTS

| | | |
|---|---|---|
| EP | 1276382 B1 | 1/2007 |
| GB | 2118511 A | 11/1983 |

(Continued)

OTHER PUBLICATIONS

International Search Report for PCT/DK2013/050268, mailed Oct. 25, 2013; ISA/EP.

*Primary Examiner* — Richard Price, Jr.
(74) *Attorney, Agent, or Firm* — Harness, Dickey & Pierce, PLC

(57) ABSTRACT

A method of suspending a bird from a shackle according to the invention comprises the following sequence of steps: I) bending at least one leg at the hock joint so that the foot comes nearer to the breast of the bird, II) inserting the leg in the shackle, III) releasing the leg at least partially. The bending may be achieved by arranging an engagement member at the breast side of the leg to hinder a movement of the hock joint towards the breast of the bird and using a carrier for forcing the foot towards the breast. The engagement member and/or carrier may be adapted to yield.

20 Claims, 12 Drawing Sheets

(56) References Cited

U.S. PATENT DOCUMENTS

Figure 1:
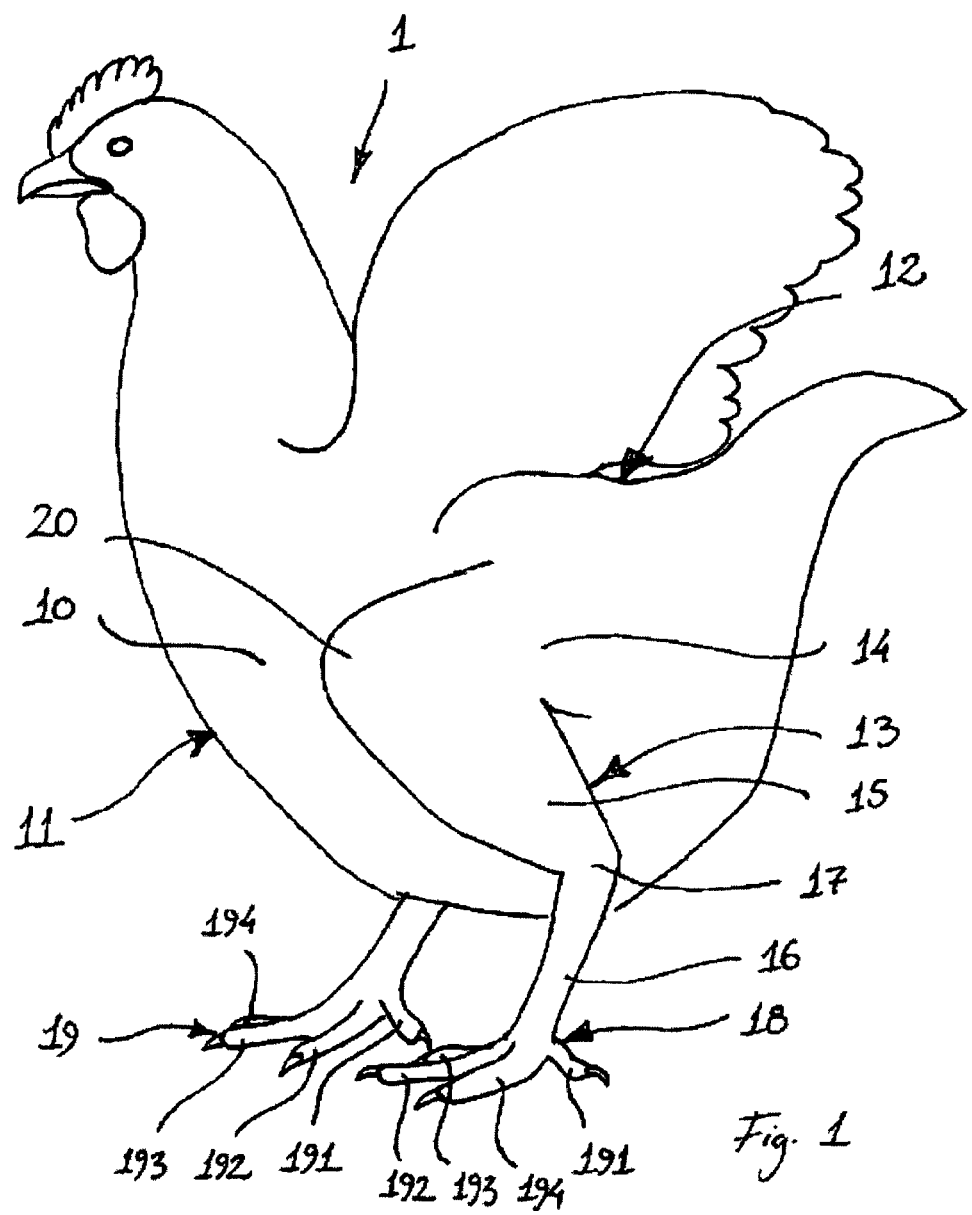

| | | | |
|---|---|---|---|
| 5,088,959 A * | 2/1992 | Heemskerk | 452/183 |
| 5,108,345 A | 4/1992 | Harben, III et al. | |
| 5,134,971 A * | 8/1992 | Krienke et al. | 119/713 |
| 5,290,187 A * | 3/1994 | Meyn | 452/178 |
| 5,342,237 A * | 8/1994 | Kolkman | 452/174 |
| 6,623,346 B2 * | 9/2003 | Lee | 452/53 |
| 7,134,956 B2 * | 11/2006 | Lee | 452/53 |
| 2003/0134586 A1 | 7/2003 | Kvorning et al. | |

FOREIGN PATENT DOCUMENTS

| | | |
|---|---|---|
| NL | 9200676 A | 11/1993 |
| WO | 2008100138 A1 | 8/2008 |
| WO | WO-2011-116774 A1 | 9/2011 |

\* cited by examiner

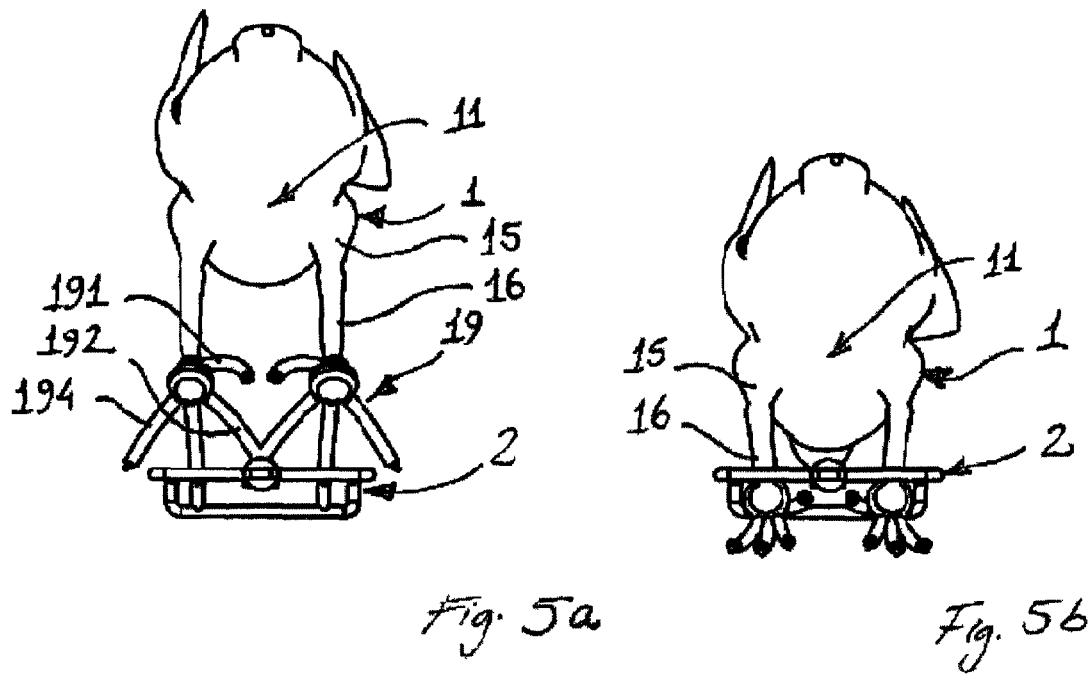

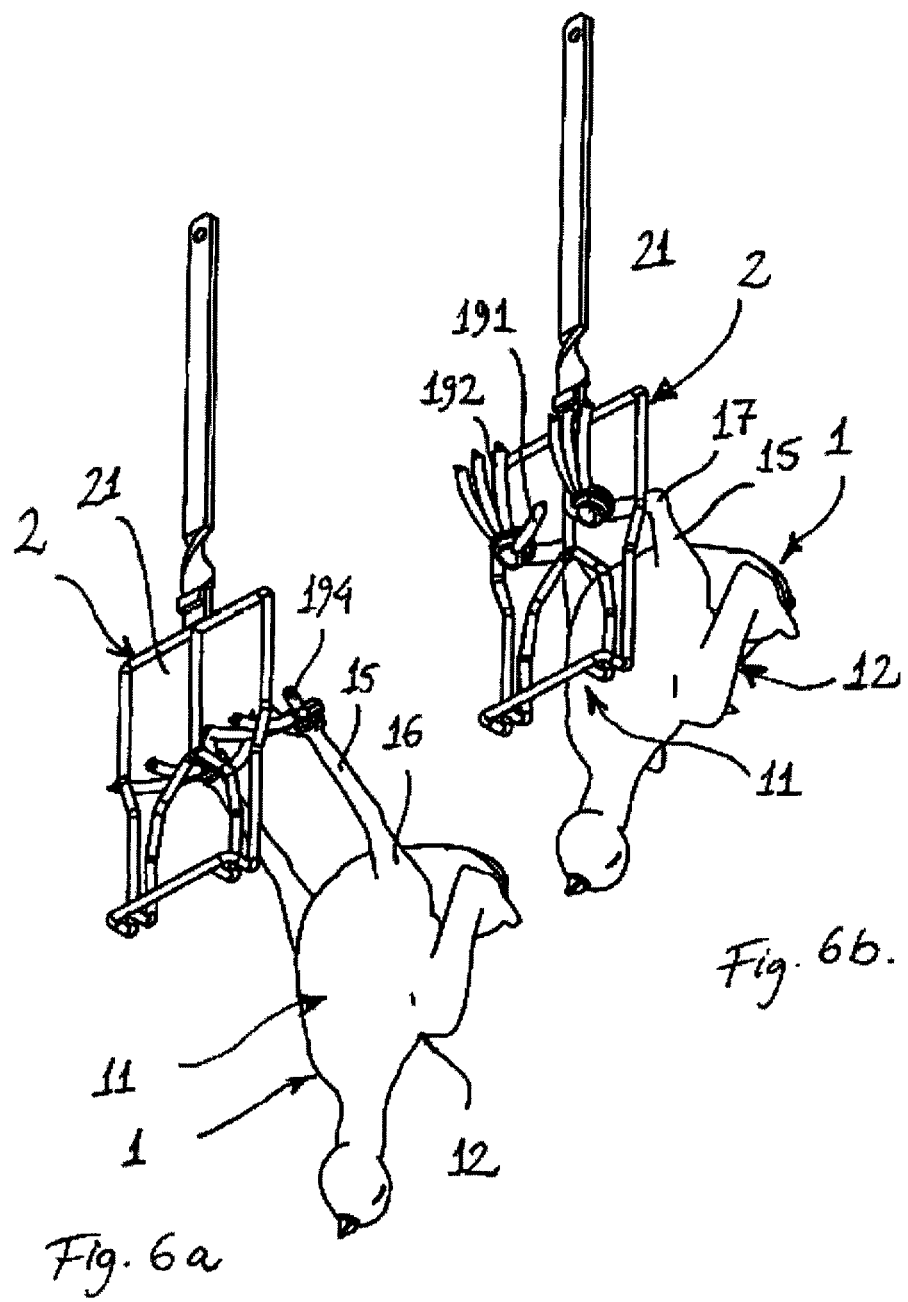

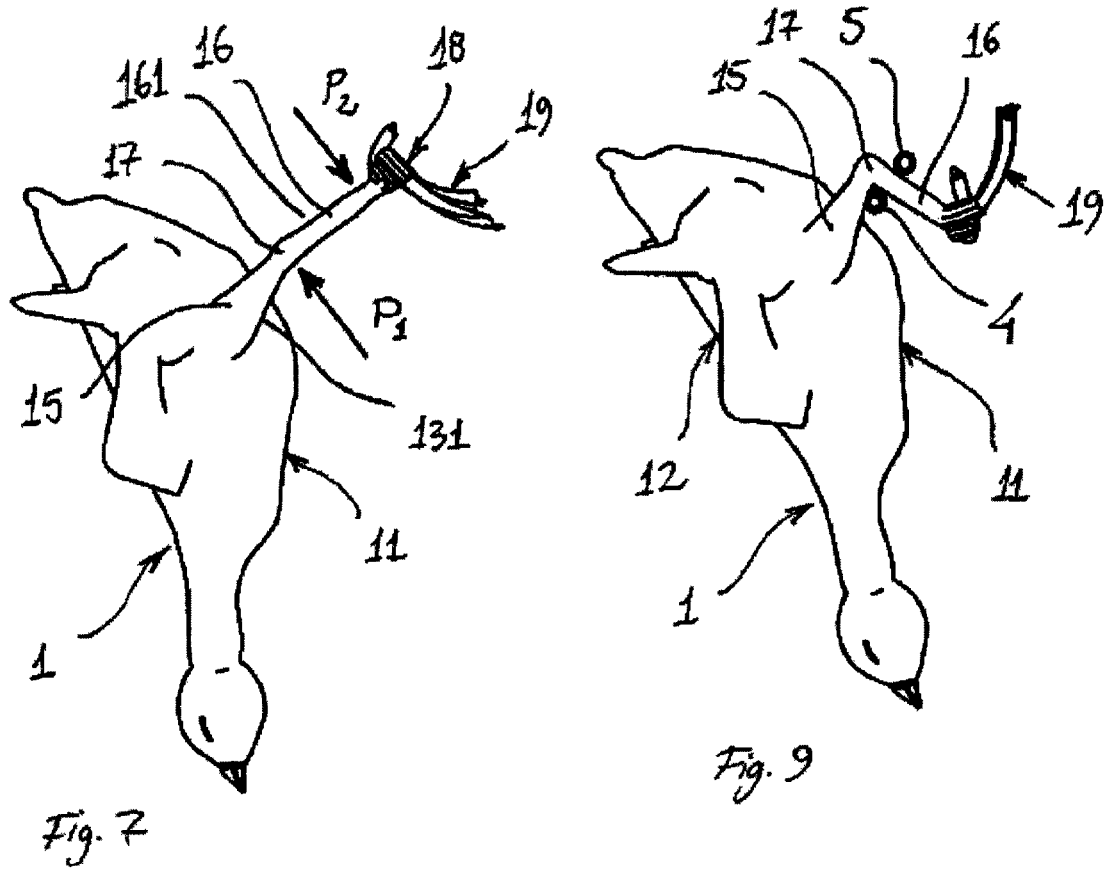

METHOD OF SUSPENDING A BIRD FROM A SHACKLE AND AN APPARATUS FOR SUSPENDING BIRDS

CROSS-REFERENCE TO RELATED APPLICATIONS

This application is a 371 U.S. National Stage of International Application No. PCT/DK2013/050268, filed on Aug. 19, 2013, which claims priority to Danish Patent Application No. PA 2012 70485, filed on Aug. 17, 2012. The disclosures of the above applications are incorporated herein by reference.

The present invention relates to a method of suspending a bird from a shackle and an apparatus for use in such a method.

In most bird slaughterhouses, particularly poultry slaughterhouses, the birds to be slaughtered are suspended from slaughter shackles on an overhead conveyor before being killed, plucked and/or eviscerated. Suspending the birds manually is a heavy and monotonous work and it is therefore desired to provide a reliable automation of the process.

WO2011/116774 and EP1276382 disclose examples of apparatuses and methods allowing the process to be at least semi-automated. The birds are arranged at the rim of a supporting surface with the feet projecting over the edge of the supporting surface and locked in retainer clips passing close by the supporting surface on a separate conveyor. The retainer clips and the attached birds then travel away from the supporting surface towards a transfer station, where the birds are transferred from the retainer clips to slaughter shackles for processing. This works very well but it still happens that the shackle does not catch the legs of the bird correctly and the arrangement of the birds in the retainer clips is performed manually.

U.S. Pat. No. 5,108,345 suggests the use of trough-shaped foot holders, which are advanced to surround the feet of the birds once the legs have been fixated and retains the digits during insertion into the shackles. This solution, however, is relatively complex and one or more digits may still project from the foot holder and become caught on the wrong side of the shackle.

It is therefore the primary object of the invention to provide an improved method for suspending birds for slaughtering, where the risk of the shackle not catching the legs correctly is reduced, and a secondary object to provide an apparatus allowing for the method to be at least partially automated.

This primary object is achieved with a method comprising the following sequence of steps:

I) bending at least one leg at the hock joint so that the foot comes nearer to the breast of the bird, thereby causing the digits of the foot to come together, II) inserting the leg in the shackle, III) releasing the leg at least partially.

When bending the leg at the hock joint so that the foot comes nearer to the breast of the bird, the digits of the foot automatically bend and come closer together due to the pull on muscles and tendons, thus causing a clenching of the foot.

In this clenched state where the bend has caused the digits of the foot to come together, the foot takes up considerably less space, thus making it easier to insert the leg in a slaughter shackle. Thus the foot and digits is positioned optimally for engagement with the shackle. An even tighter clenching may, however, be achieved by extending the knee joint between the drumstick and the thigh.

This is particularly advantageous when using closed-loop shackles of the type shown for example in US29819723, where, during step II), the foot/feet has to be passed through one or more openings in the shackle. Closed-loop shackles has the advantage that they do not easily become entangled, which may particularly be a problem during plucking of the birds, and are therefore preferred as slaughter shackles in many bird slaughterhouses.

Once the leg has been inserted in the shackle, it is at least partially released, causing the digits to move away from each other so that the foot reextends and opens. This may contribute to preventing the leg from coming out of the shackle during subsequent processing of the bird, since the digits will functions as barbs.

Most shackles used today are designed for suspending the bird from both legs and it is therefore preferred that both legs are bent, so that they can be easily inserted, and both legs are preferably bent in one operation. For the sake of clarity the following description of the invention will refer only to embodiments where both legs are bend and the bird suspended from both legs, but it is to be understood that this need not be the case.

It is noted that the invention is described with reference to healthy birds. In birds having injuries and/or deformities the digits may not come together when the leg is bent and/or the number of digits on one or both feet may be abnormal so that the foot has a different shape when the digits have come together.

The bending of the legs and insertion in the shackle may be performed manually. However, to achieve the secondary object of the invention, an apparatus is provided comprising a leg bending mechanism and a positioning mechanism, said leg bending mechanism being adapted for bending at least one leg of the bird at the hock joint so that the foot comes nearer to the breast of the bird and said positioning mechanism being adapted for positioning the leg(s) of the bird for engagement with a shackle on a conveyor.

The leg bending mechanism can be embodied with an engagement member and a carrier. In use the engagement member is arranged at the breast side of the leg to hinder a movement of the hock joint towards the breast of the bird and said carrier is used for forcing the foot towards the breast. One engagement member and/or one carrier may engage both legs of the bird, for example to achieve a substantially synchronous bending of the legs, but it may also be advantageous to use two or more, arranged at each side of the bird.

It is noted that the wording "hinder a movement of the joint" is not intended to mean that the engagement member has to keep the hock joint in the exact same position in relation to the body during the bending of the leg. Only that it should offer resistance to the movement of the drumstick, which could otherwise result from the foot being pushed towards the breast, so that the leg actually bends at the hock joint instead of just swinging at the hip. In addition, a slight movement of the joint towards the back of the bird due to the engagement with the engagement member may also be acceptable or even desired to reduce the risk of fractures on the leg or to make the digits come even closer together.

The bird and the engagement member may be moved in relation to each other so that the position of the engagement member in relation to the hock joint changes during the bending process. The engagement member and/or carrier may follow a predetermined track in relation to the bird, but may also be allowed to yield to adapt to difference in the size and shape of the birds to be processed.

At present it is considered advantageous to first make the engagement member engage the leg and then cause the carrier to force the foot towards the breast, but a different sequence of operation may be used, depending for example on the type, breed and size of bird and on whether the bird has been stunned or killed in advance. Stunning or killing the bird prior to step I) has the advantage that it does not resist the bending, which might potentially cause injuries, particularly to the legs and wings. It may, however, be sufficient to perform the suspension process in a dark room since most birds tend to relax when it is dark.

The carrier preferably pushes on the back side of the shank, but may also exert a pull and/or may engage the foot or digits.

The speed and force of operation of the engagement member and carrier should be chosen so that the risk of injuries to the bird is minimized as far as possible. Exactly how the operation should be, depends on a number of factors such as the size, shape and material of the engagement member and the carrier and of the type and size of bird, and will therefore have to be defined by experiment. Such experiments will be simple and will not pose any difficulty to the skilled person.

The movements described above and in the following are relative movements between the bird and the different parts of the apparatus, meaning that they may be achieved by moving the bird or part thereof, by moving the apparatus or part thereof, or by combining such movements.

To ease the bending of the legs, the body of the bird may be arranged to rest on a support and/or be fixated during step I). Likewise, the insertion of the legs in the shackle may be eased by supporting and/or fixating the bird during step II). The support may be simply a surface on which the body of the bird is resting, but more sophisticated supports shaped according to the shape of the body may also be used. Fixation may for example be achieved by pressing the body of the bird against a support, possibly only under the influence of gravity, by holding on to the wings and/or by arranging the bird in a holder encircling the body of the bird wholly or partially. Removing the body of the bird from the support surface or vice versa so that the bird comes to hang from the legs under the influence of gravity may contribute to the bending process.

It is noted that there does not have to be a clear separation between steps I) and II) of the method, meaning that the bending of the legs may cause in itself cause the legs to come into contact or engagement with the shackle. Likewise, the positioning mechanism may be a build-in part of the leg bending mechanism so that at the end of the leg bending process the legs are positioned for engagement with the shackle.

Figure 2:
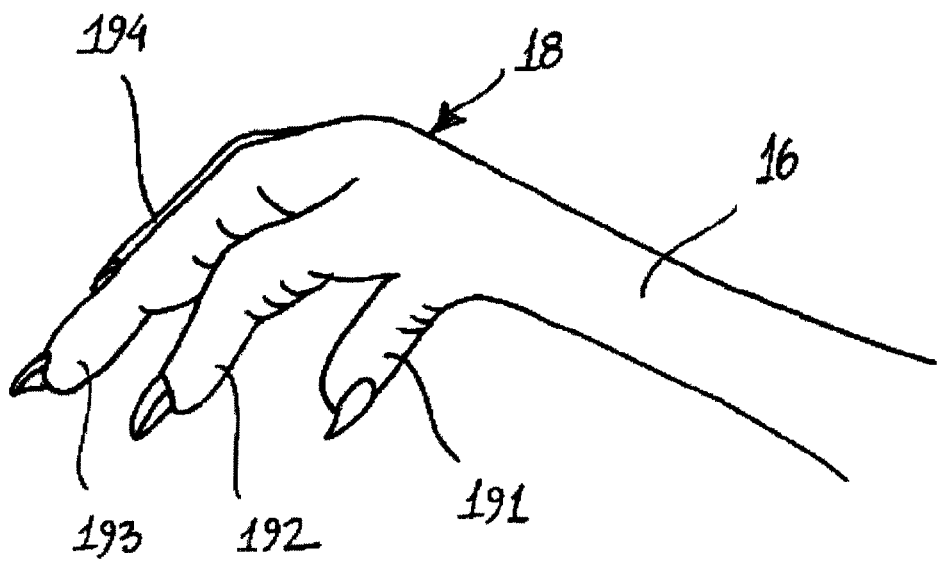
Figures 3A, 3B:
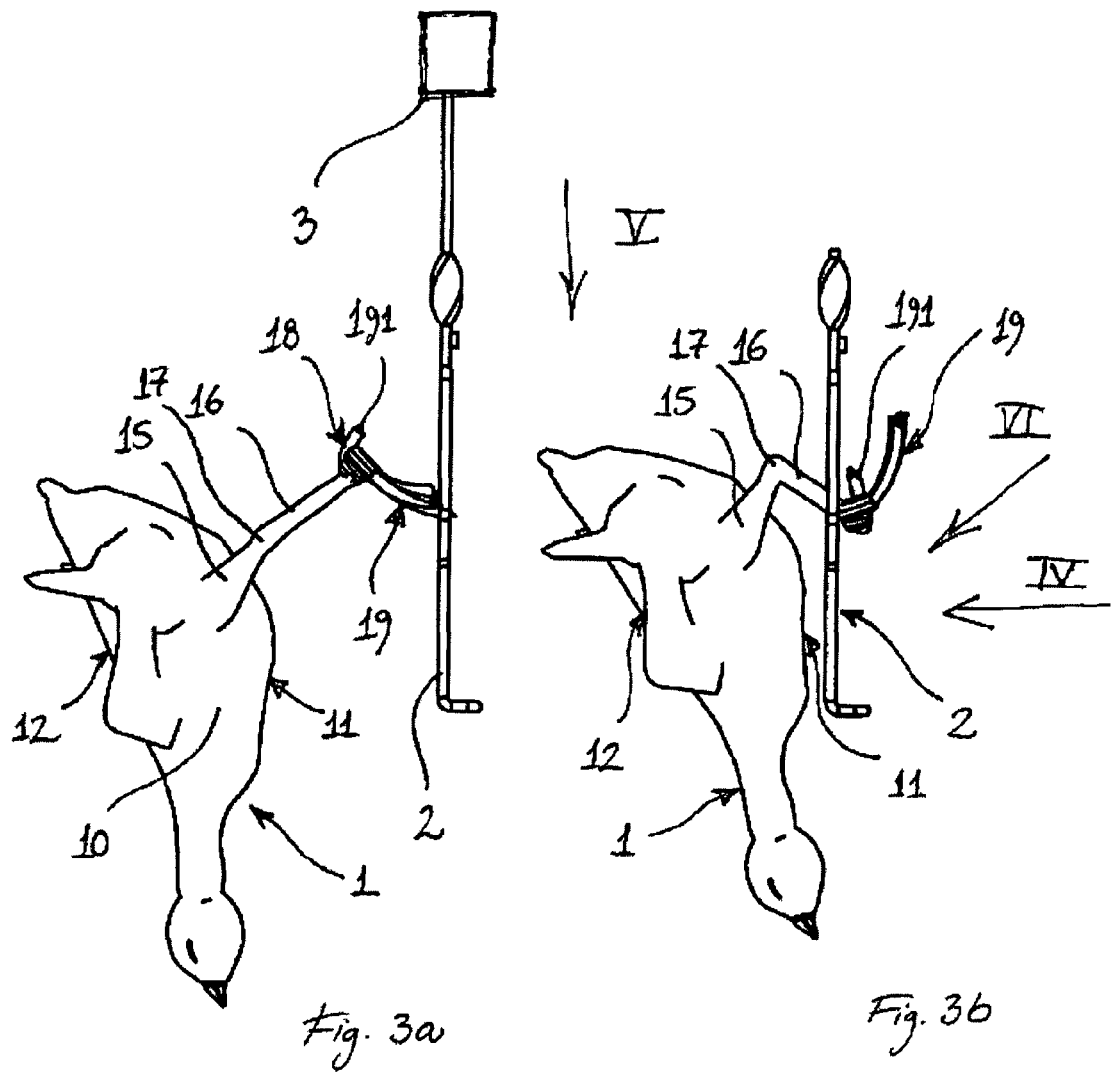
Figures 4A, 4B:
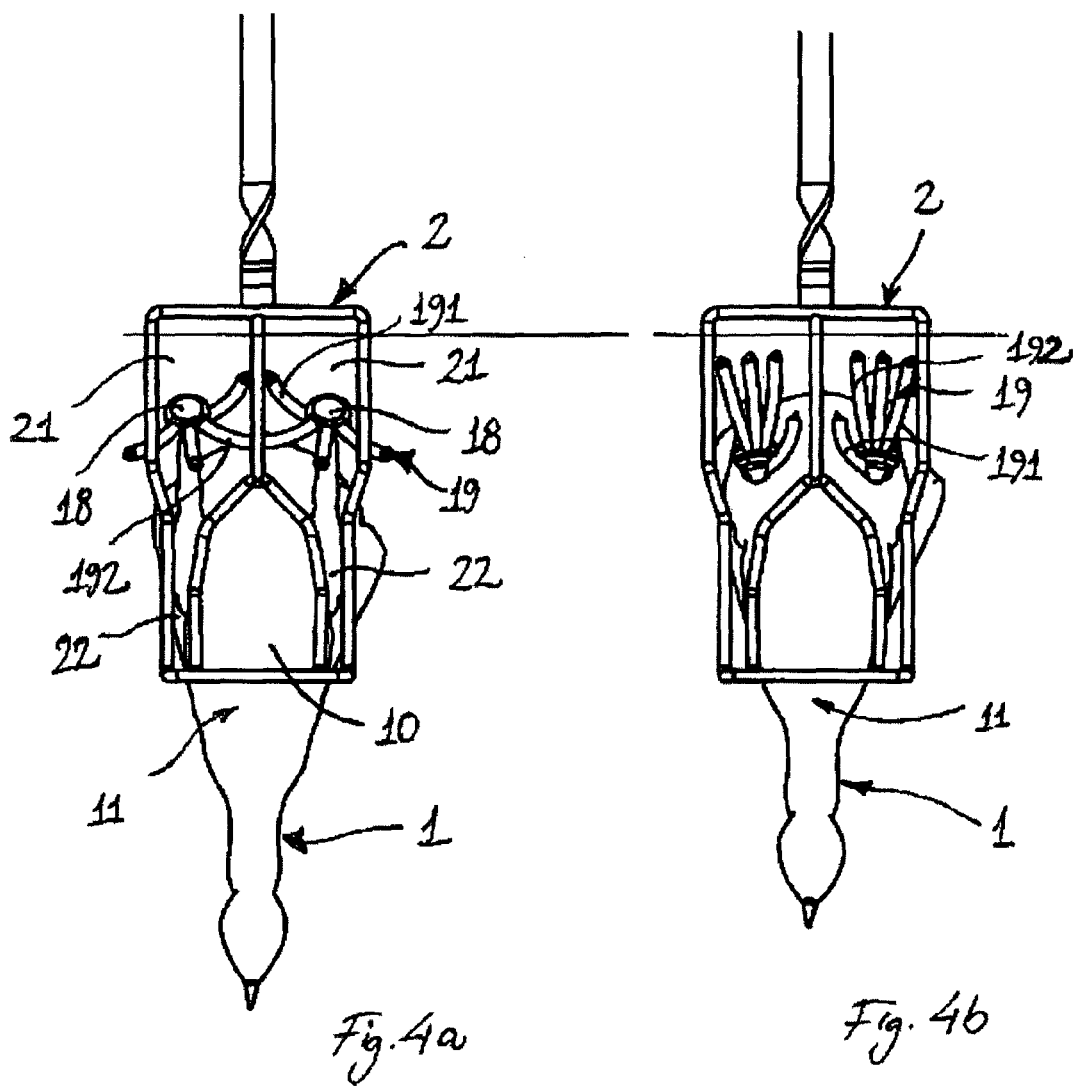
Figure 8:
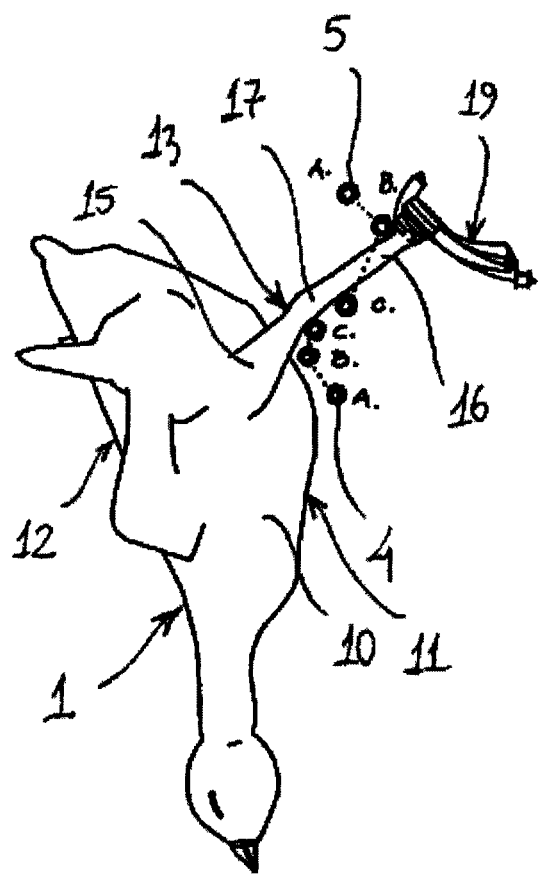
Figure 10:
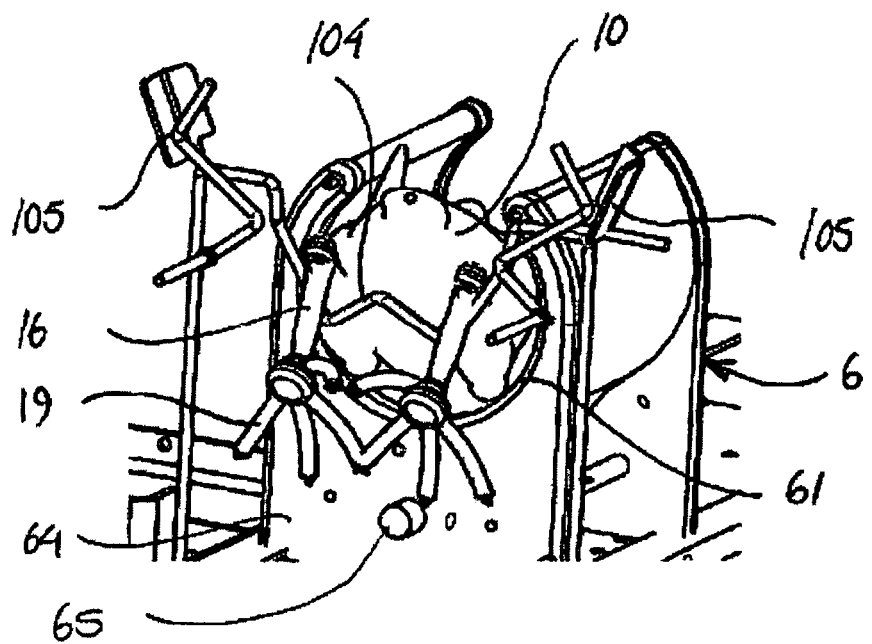
Figure 12:
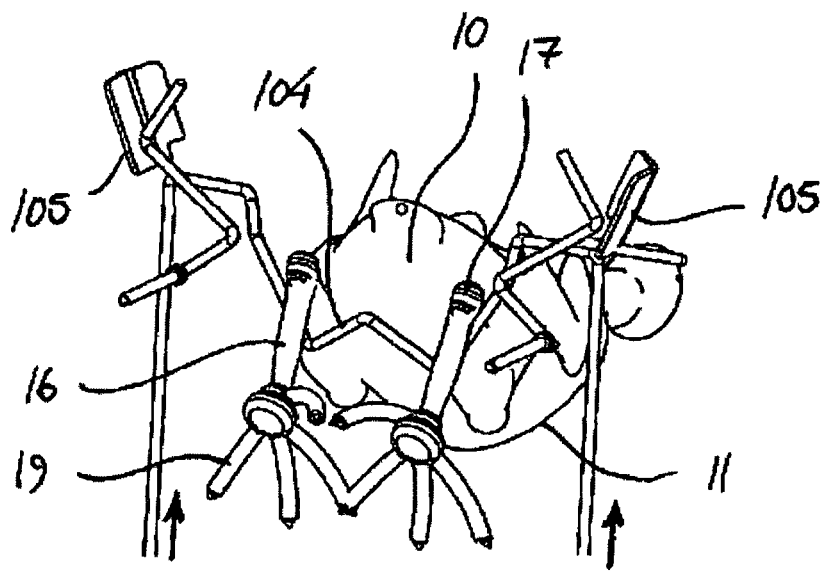
Figure 11:
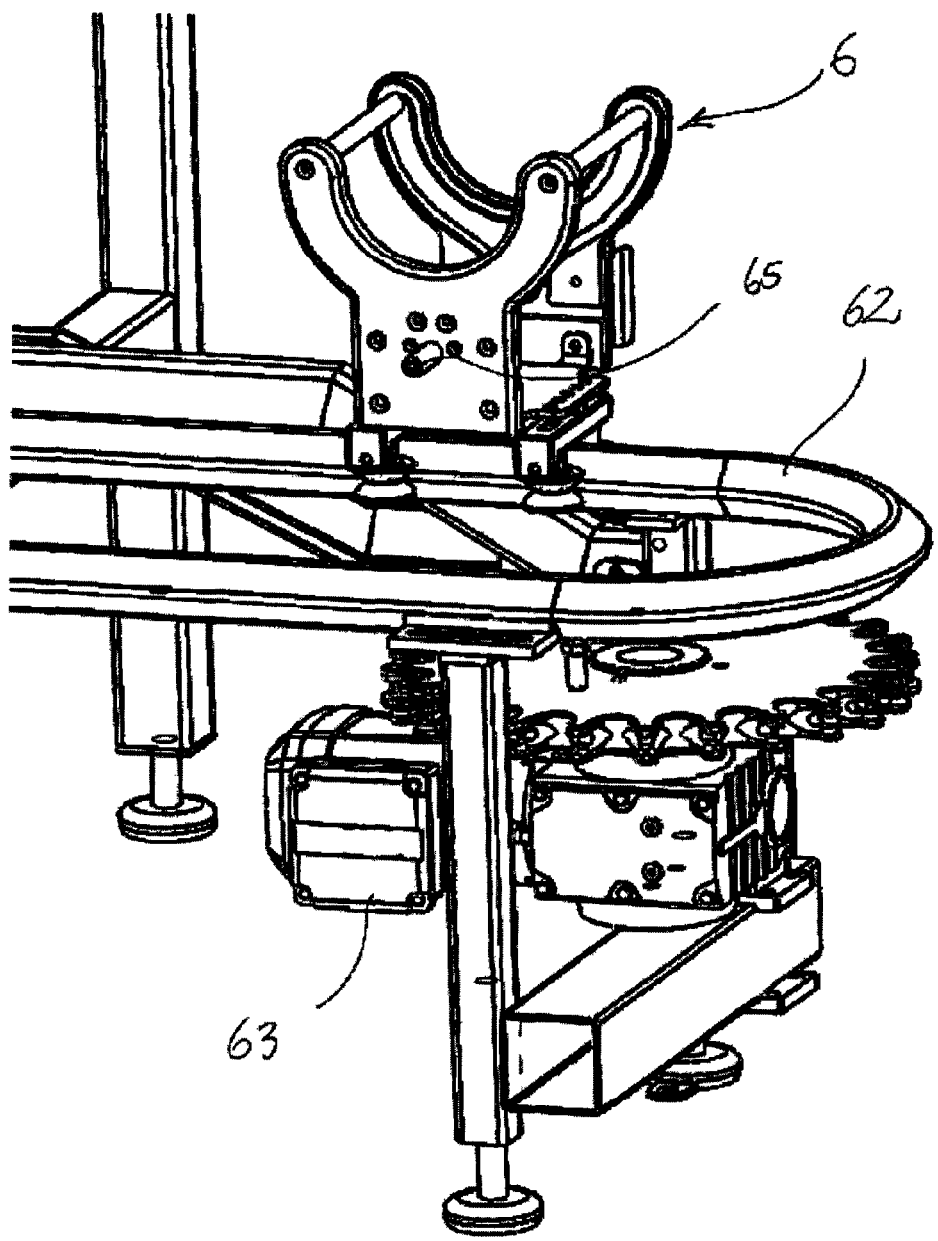
Figure 13:
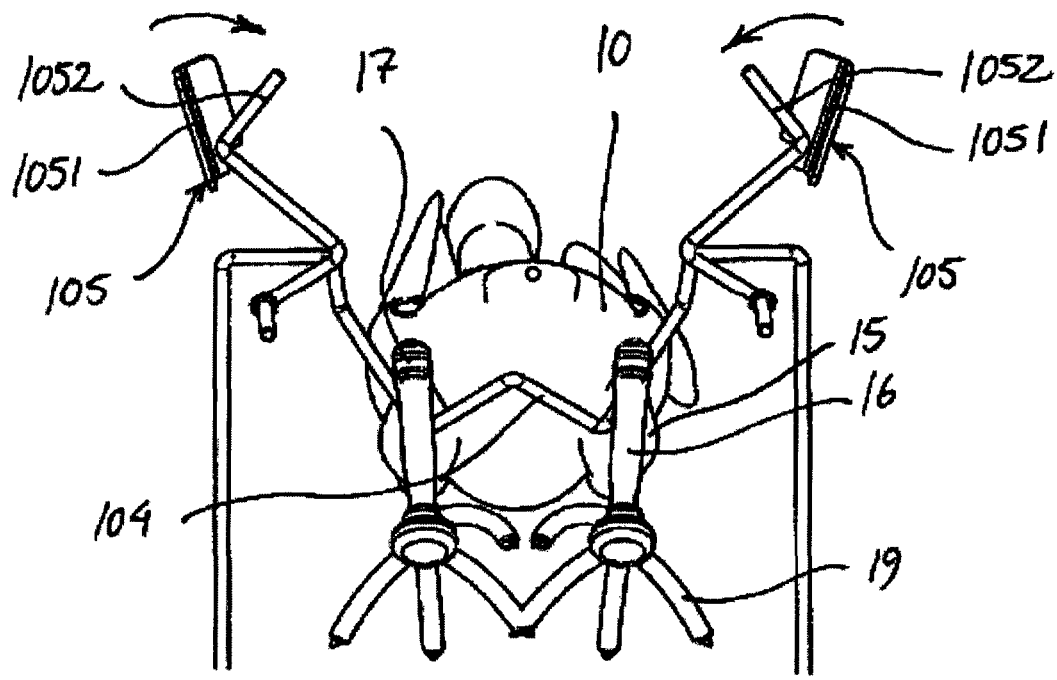
Figure 14:
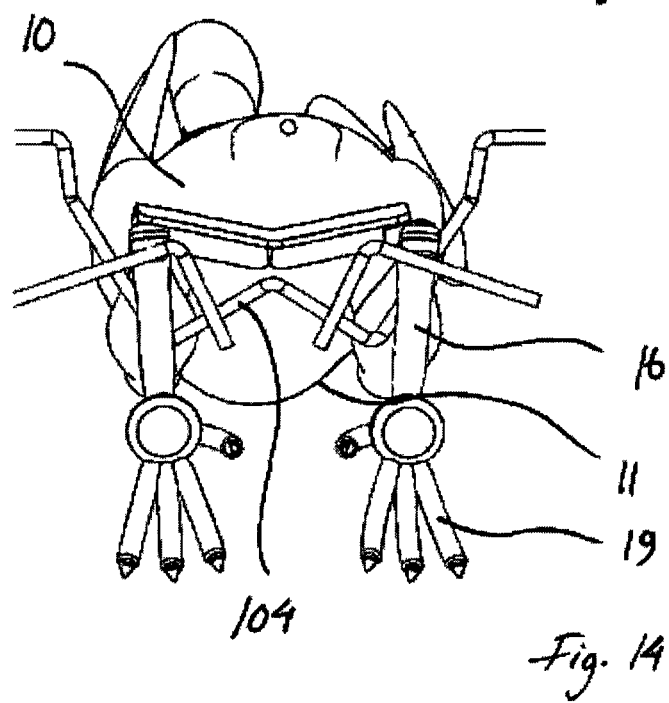
Figure 15:
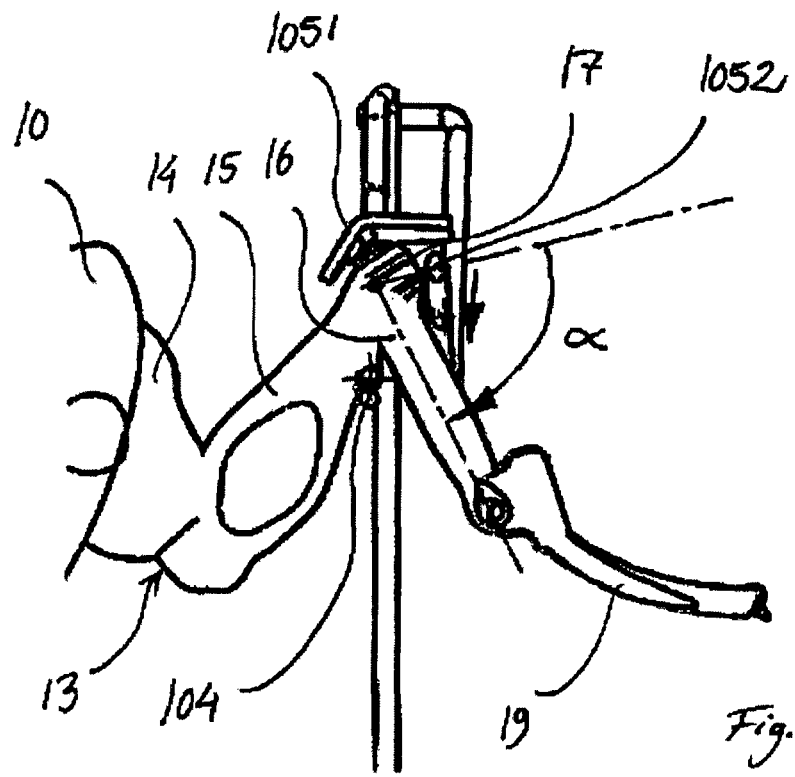

In the following the invention will be described in closer detail with reference the drawing, where:

FIG. 1 is a sketch of a live chicken,

FIG. 2 is a sketch of the right foot of the chicken in FIG. 1 when the leg has been bent, FIG. 3a is a schematic side view of a chicken with legs in their unbent position and prior to engagement with a slaughter shackle, FIG. 3b is a schematic side view corresponding to FIG. 3a but where the legs of the chicken has been bent and brought into engagement with the slaughter shackle, FIGS. 4a and 4b correspond to FIGS. 3a and 3b, respectively, but seen from the right side as indicated by the arrow IV, FIGS. 5a and 5b correspond to FIGS. 3a and 3b, respectively, but seen from above as indicated by the arrow V, FIGS. 6a and 6b correspond to FIGS. 3a and 3b, respectively, but seen in a perspective view as indicated by the arrow VI, FIG. 7 is a schematic side view of a chicken with legs in their unbent position, FIG. 8 corresponds to FIG. 7 further showing three different positions of a rail system for bending the legs, FIG. 9 corresponds to FIG. 8, but showing only the last position of the rail system and the legs of the chicken being bent, FIG. 10 is a perspective sketch of a chicken arranged in a holder at a leg bending station, FIG. 11 is a perspective sketch showing a holder arranged on a rail system, FIG. 12 corresponds to FIG. 10, but showing only the chicken, the engagement member and the carriers, FIG. 13 corresponds to FIG. 12 but seen directly from behind as shown by the arrow XI in FIG. 12, FIG. 14 corresponds to FIG. 13 but showing the carriers in a closed position, FIG. 15 is a cross-sectional view showing the leg of a chicken will held by an engagement member and a carrier as in FIGS. 10-14, and FIG. 16 corresponds to FIG. 15, but where the body of the chicken has been released to hang under the influence of gravity.

A chicken is shown alive and standing in FIG. 1 to illustrate the anatomy of a bird commonly used for human consumption and hence processed in slaughterhouses in large numbers. It is, however, to be understood that other types of birds such as ducks, geese, turkeys, quails or pigeons may also be processed according to the invention.

In the following the orientation of the bird 1 and parts thereof will be defined by the orientation of its breast 11 and back 12. In this respect it is noted that when using wordings such as "towards the breast side" and "towards the back side" it is only the intention to indicate two opposite overall directions, not an exact angle.

The chicken is shown with its wing raised to allow a better view of the leg 13, which includes the thigh 14, the drumstick 15 and the shank 16. The thigh and drumstick are connected at the knee joint 20, the drumstick and the shank are connected at the hock joint 17, and the shank extends from the hock joint to the foot 18. As may be seen, the hock joint 17 is slightly bent in the natural position of the leg, the angle between the drumstick and shank being smaller at the breast side of the leg than at the back side of the leg. A full extension of the leg so that the tibiotarsal bone inside the drumstick becomes parallel to the shank is normally not possible.

The foot 18 includes four digits 19, a first digit 191 projecting substantially towards the back side and the second 192, third 193 and fourth 194 digits projecting towards the breast side.

When the chicken lifts a foot 18, it pulls the foot towards the breast 11, bending the leg at the hock joint 17. This results in a pull on tendons (not shown) in the leg, which causes the digits 19 to automatically come together and gradually bend to the clenched position shown in FIG. 2.

In modern poultry slaughterhouses the birds 1 are hung in shackles 2 running on an overhead conveyor 3 as shown in FIGS. 3a and 4a by passing the feet 18 through openings 21 in the shackle and/or arranging the shanks in recesses 22. When the body 10 of the bird is released to hang freely from the shackle, it is pulled down by its own weight until the feet come into a firm abutment (not shown) against the shackle.

The overhead conveyor, which may travel into or out of the plane of the paper in FIG. 3a, is shown only in FIG. 3a, but it is to be understood that the shackles shown in the other figures are also mounted on such conveyors. The design of such conveyors is very well known to the skilled person and will therefore not be described here.

Suspension from shackles as described above has been used for decades and has proven to be very reliable, regardless if the poultry is stunned or killed prior to suspension or not.

With the increased use of automated apparatuses for suspending the poultry it has, however, been found that the feet 18 and legs 13 of birds 1 do not always engage the shackle 2 correctly, resulting in the bird falling or hanging from one leg. This problem has now been solved by bending the legs of the bird so that the digits come together as described above with reference to FIGS. 1 and 2, before bringing the feet and legs into engagement with the shackle. In this way the feet takes up considerably less space and are hence easier to pass through the openings 21 in the shackle as shown in FIGS. 3b and 4b without necessitating complex foot holders. As may be seen by comparing FIGS. 4a and 4b the closing of the feet particularly minimizes the risk of one or more digits 19 coming on the wrong side of the shackle. This not only minimizes the risk of the foot not coming through the opening at all, but also reduces the risk of digits being broken, thus increasing the value of the feet as a food product.

FIGS. 5a and 5b and FIGS. 6a and 6b shows the difference between the suspension with feet in their natural position and in the closed position seen from different angles.

The drawing shows only closed-loop shackles 2, which are particularly advantageous as slaughter shackles as they do not easily become entangled, particularly during plucking of the birds, but the invention of course also applies where shackles of a more open design are used.

In FIGS. 3a, 4a, 5a and 6a the bird 1 is shown with the digits 19 in a relatively spread out position which is the natural position when the bird is conscious. If the bird has been stunned or killed prior to suspension, the feet will be relaxed and the digits slightly closer to each other than shown, but the problem of digits coming on the wrong side of the shackle 2 is nonetheless occurring regularly when suspending unconscious birds.

The actual bending of the legs 13 may be performed as shown in FIG. 7 by applying a first force P1 on the breast side 131 at the hock joint 17 and a second force P2 on the back side 161 of the shank 16. These forces may be applied by actively pushing on the respective parts of the leg or by forcing the leg against a stationary abutment member, possibly utilising the pull of gravity. A pulling force on the opposite side of the leg will of course achieve the same result, but may be difficult to apply in practice.

The first force P1 may also be applied on the drumstick 15 and the second force P2 may be applied on the foot 18 or even on the digits 19 and the direction of the forces need not be exactly as shown in FIG. 7, which is only intended to illustrate the principle.

In one possible embodiment, which is structurally simple and hence reliable, the leg bending mechanism comprises two non-parallel rod-shaped rails 4,5 as illustrated in cross-section in FIG. 8. In use the legs 13 of the bird 1 is passed between the rails, the first rail 4 serving as an engagement member and the second rail 5 serving as a carrier. At the entrance end of the rail system the rails 4,5 are relatively far apart, illustrated by the cross-sections marked A. Further down in the direction of movement of the bird, the rails 4,5 are closer to each and come into contact with the body 10 and shank 16 of the bird, respectively, as shown by situation B. Still further down both rails 4,5 are at the hock joint 17 as shown by situation C, the uppermost rail 5 having forced the shank to the position shown in FIG. 9.

The rails are preferably stationary, though possibly capable of yielding as will be described below. This has the advantages that a continuous flow of birds may be passed into the leg bending mechanism and then transferred to a continuous row of shackles travelling on an overhead conveyor in a manner well known to the skilled person. The last part of the rail system thus functions as the positioning mechanism, but it is of course possible to provide this separately.

When being passed through the rail system 4,5, the bird 1 may be held in any suitable manner, either hanging from a conveyor, resting on a supporting surface or being held manually, as long as the legs 13 of the bird are free to pass between the two rails as explained above. The tracks of movement of the bird need not be linear. On the contrary it may be advantageous to gradually move the body 10 of the bird from a lying position to the head down position shown in FIG. 9. It is even possible to start from a position where the head is upwards, possibly starting with conscious birds standing on their feet. The rails may also be arranged in a different spatial orientation to adapt to correspond to a different spatial position of the body of the bird during processing.

As described above, the bending at the hock joint 17 results in a pull on tendons and muscles in the legs 13, which in turn causes the digits to come closer together and the foot 18 to clench. An even tighter clenching may, however, be achieved by extending the knee joint 20. This may for example be achieved by letting the body of the bird hang from the leg bending mechanism under the influence of gravity, or, alternatively, by supplying the rail system described above with one or more further rails (not shown) guiding the path of the drumstick and thigh in relation to each other.

The rails 4,5 may be curved, so that the rails system has the overall shape of a sector of a circle when seen from above, and/or be moveable, e.g. by hydraulics. The use of hydraulics has the added advantage that it may allow the rail to yield if the pressure against the bird becomes too high and this of course also applies to other embodiments of the engagement members and/or carriers. In this way the risk of damages to the bird may be minimized and the system will be capable of adapting to differences in the size and shape of the bird. A similar yielding effect may be achieved by means of springs.

To minimize the risk of damages to the skin on the legs of the birds the rails are preferably of a rounded cross-sectional shape and made with a smooth surface with a low frictional resistance. The low frictional resistance also ensures that the legs pass smoothly between and along the rails and are not pulled wry in relation to the body of the bird, which may potentially lead to them becoming stuck and hence to a production standstill.

In an alternative embodiment (not shown), the body 10 of the bird is fixated in relation to a supporting surface and arranged with its legs projecting over its edge, said supporting surface also serving as a leg engagement member. A carrier is then moved close by the edge of the supporting surface in a direction perpendicular to the plane of the supporting surface so that it comes into contact with the feet or shanks and forces the shanks in its direction of movement thereby causing the hock joints to bend. If the bird is lying breast down, the carrier should be moved downwards and vice versa.

The support surface need not be plane but may be a holder adapted to fit the shape of the body of the bird. Likewise, the support surface may include recesses or braces adapted for holding the legs so that they are not pushed aside by the carrier during bending.

In this embodiment, the carrier is preferably a rod having a rounded cross-sectional shape, which is swung, rotated or displaced to pass by the edge of the support surface. As an example, two rods may be arranged one at each side of the support surface and adapted for swinging inwards and downwards to each come into contact with one leg of the birds, the rods being substantially parallel and with their free ends close to each other when they come into contact with the legs of the bird.

In another alternative (not shown), the shanks of the bird are clamped in a substantially horizontal position between two holding members or between a holding member and a support surface and the body 10 of the bird is then allowed to hang substantially freely, thereby being the legs under the influence of gravity.

In still another embodiment the principles behind the former two embodiments are combined as illustrated in FIGS. 10-16.

Starting from FIG. 10 the body 10 of the bird is located in a holder 6, where the support surface is embodied as a movable belt 61 allowing the bird to be rotated to an optimal position of the legs 13 before commencing the actual suspension process. In one possible embodiment, the holder is arranged on a rail system 62 as shown in FIG. 11 and being pulled by a chain (not shown) driven by a motor 63. In FIG. 11 the belt 61 and end plate 64 of the holder are not shown and it is to be understood that though not shown a series of identical holders will be arranged on the rail system as is known from many other bird slaughtering processes. The holder may be provide with its own motor engaging the shaft 65 or a central motor unit for turning the belt 61 may be provided at another section of the rail system (not shown).

An engagement member 104 is then raised from below as indicated by the arrows in FIG. 12 so that it comes into engagement with the legs at the hock joints 17 on the breast side between the drumsticks 15 and the shanks 16 as shown in FIG. 13.

The engagement member 104 is here embodied as a bend rod, where the bends contribute to positioning the legs with a distance corresponding to the distance between the openings in the shackles 2, but it is of course possible to use an engagement member with smaller or no bends.

Carriers 105 are then swung in from above as indicated by the arrows in FIG. 13 to the position shown in FIG. 14, thereby clamping the legs between the engagement member and the carriers and bending the legs as shown in FIG. 15.

It is noted that the movement of the carriers 105 may also be a translational movement or that they may follow a complex pattern consisting of a combination of translation and rotation at that the same applies to the movement of the engagement member 104. Likewise it is to be understood that there need not be two carriers as shown in FIGS. 10-14 and that the engagement member and carriers may be moved more or less simultaneously.

Figure 16:
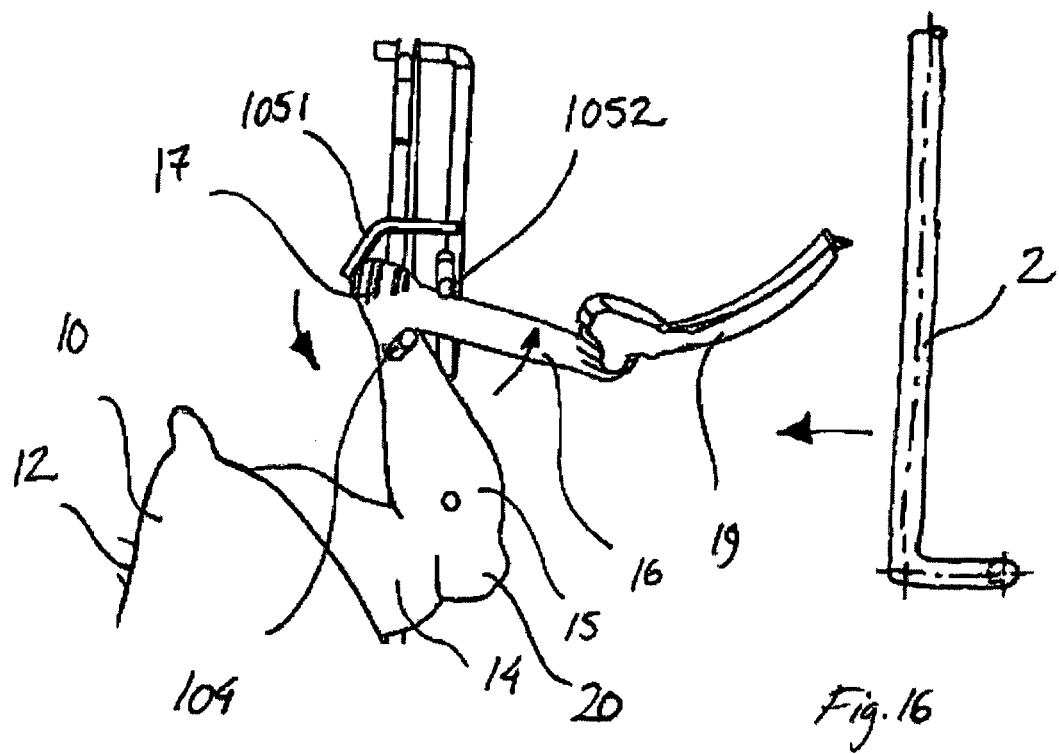

As is also seen in FIGS. 15 and 16 the carriers 105 in this embodiments comprises a first plate-shaped part 1051 engaging the hock joint from above and abutting the back side of the joint and a second rod-shaped part 1052 engaging the back side of the shank 16. The resulting concave shape of the carrier contributes to bending the legs, but it is to be understood that other shapes of the two parts and of the carrier as such may also result in a satisfactory bending. As an example the first part may also be formed from one or more rods.

Experiments have shown that the bending angle α shown in FIG. 15 should be at least 30-40 degrees to achieve a sufficient closing of the digits and this angle interval of course applies to all embodiments irrespective of how the bending of the leg is achieved.

When the body 10 of the bird is subsequently released from the holder 6, the bird comes to hang from the engagement member and the carrier under the influence of gravity as shown in FIG. 16 and described above with reference to other embodiments. The release of the body may for example be achieved by displacing the holder 6 in relation to the bird. If wishing to avoid the use of the relatively complex holder shown in FIG. 10 it is, however, also possible to use a movable clamping device running in parallel to a belt conveyor carrying the bird, and to allow the body of the bird to drop from the conveyor once the legs have been clamped either by coming over an end edge of the conveyor or by the path of the clamping devices and holders moving away from each other. Likewise it is to be understood that the engagement member may be part of the support surface.

As shown by the curved arrows in FIG. 16, the release of the body of the bird results in a rotation about the engagement member 104, which brings the shanks to a substantially horizontal position, and the shackle 2 can then be brought in over the feet as indicated by the straight arrow in FIG. 16, or the feet can be moved into the shackle. As is seen the first part 1051 of the carrier is embodied so that the hock joint does not come out of engagement therewith during the rotation.

It is also noted that though not shown in FIGS. 15-16 the rotation may cause a movement of the hock joint towards the back 12 and/or an extension of the knee joint 20, which may contribute to bringing the digits even closer together. Such a movement of the hock joint and/or extension of the knee joint may also apply to other embodiments with similar effect.

When designing the apparatus and particularly the clamping device, careful consideration of the strength of the shanks of the birds to be processed is necessary, so that the risk of fractures is minimized.

As explained above, the movement of the bird and apparatus is a relative movement, meaning that either the bird or the apparatus may be kept stationary or that both may be moved to achieve the relative movements occurring in each of the embodiment described.

Engagement members and carriers are preferably made from stainless steel as this material is known to be resistant to the harsh conditions encountered in slaughterhouses and is easy to keep clean, but other materials, including polymers and ceramics, may also be used.

The suspending of conscious birds may advantageously be performed in a room with little or no light since most birds tend to stay still when it is dark.

The invention claimed is:

1. A method of suspending a bird having a body and two legs from a shackle, said body having a breast and each leg comprising a breast side, a back side, a hock joint, a shank and a foot with digits, and said method comprising the following sequence of steps:
   I) applying force to at least one leg to bend at the hock joint so that the foot comes nearer to the breast of the bird,
   II) inserting the at least one leg in the shackle,
   III) releasing the at least one leg at least partially.

2. The method according to claim 1, where the bending in step I) causes the digits of the foot to come together.

3. The method according to claim 1, where both legs are bent and inserted in the shackle.

4. The method according to claim 1, where, during step II), the foot/feet are passed through one or more openings in the shackle.

5. The method according to claim 1, where, in step I), an engagement member is arranged at the breast side of the leg to hinder a movement of the hock joint towards the breast of the bird and a carrier is used for forcing the foot towards the breast.

6. The method according to claim 5, where the engagement member is arranged at the hock joint and the carrier is pushing on the back side of the shank.

7. The method according to claim 5, where one engagement member and/or one carrier engages both legs of the bird.

8. The method according to claim 1, where the body of the bird is resting on a support and/or is fixated during steps I) and/or II).

9. The method according to claim 1, where the bird is stunned or killed prior to step I).

10. An apparatus for suspending birds having a body and two legs from shackles, said body having a breast and each leg comprising a breast side, a back side, a hock joint, a shank and a foot with digits, and said apparatus comprising a leg bending mechanism and a positioning mechanism, said leg bending mechanism being adapted for engaging at least one leg of the bird and forcing it to bend at the hock joint so that the foot comes nearer to the breast of the bird and said positioning mechanism being adapted for positioning the leg(s) of the bird for engagement with a shackle.

11. The apparatus according to claim 10, the bending mechanism is adapted for bending the at least one leg so that the digits of the foot come together.

12. The apparatus according to claim 10, where the leg bending mechanism is adapted for bending both legs of the bird.

13. The apparatus according to claim 10, where the leg bending mechanism comprises an engagement member and a carrier, said engagement member being adapted for engaging the leg at the breast side thereof to hinder a movement of the hock joint towards the breast of the bird and said carrier being adapted for forcing the foot towards the breast.

14. The apparatus according to claim 13, where the engagement member is adapted for engaging the leg at the hock joint and the carrier is adapted for pushing on the back side of the shank.

15. The apparatus according to claim 13, where the engagement member and/or carrier is adapted to yield.

16. The apparatus according to claim 13, one engagement member and/or one carrier is/are adapted for engaging both legs of the bird.

17. The apparatus according to claim 13, where the engagement member is rod-shaped with two bends, said bends being provided at a distance corresponding to the distance between openings in the shackle.

18. The apparatus according to claim 13, where the carrier comprises a first part adapted for engaging the leg at the hock joint and a second part adapted for engaging the shank, said first and second parts giving the carrier a concave shape.

19. The apparatus according to claim 10, further comprising a support surface adapted for supporting the body of the bird and/or a fixture adapted for fixating the body of the bird.

20. The apparatus according to claim 10, where the leg bending mechanism includes two non-parallel rod-shaped rails, a first rail serving as engagement member and a second rail serving as carrier.

* * * * *